United States Patent
Young et al.

(10) Patent No.: US 6,567,011 B1
(45) Date of Patent: May 20, 2003

(54) MEDIA SYSTEM AND REMOTE CONTROL FOR SAME

(75) Inventors: Jeffrey J. Young, Orange, CA (US); David N. Muncy, Losser (NL); Richard A. Firehammer, Jr., Bainbridge Township, OH (US); Anthony H. Phan, Huntington Beach, CA (US)

(73) Assignee: Universal Electronics Inc., Cypress, CA (US)

( * ) Notice: Subject to any disclaimer, the term of this patent is extended or adjusted under 35 U.S.C. 154(b) by 0 days.

(21) Appl. No.: 09/418,091

(22) Filed: Oct. 14, 1999

(51) Int. Cl.[7] .............................. G08C 19/00; H04N 5/44
(52) U.S. Cl. ............................ 340/825.69; 340/825.72; 340/7.39; 359/142; 359/146; 341/176; 348/734
(58) Field of Search ...................... 340/825.69, 825.72, 340/7.39; 359/148, 142, 143, 159, 176, 146; 341/176; 361/171, 172; 348/734

(56) References Cited

U.S. PATENT DOCUMENTS

| | | | | |
|---|---|---|---|---|
| 4,566,034 A | * | 1/1986 | Harger et al. | 340/825.22 |
| 4,623,887 A | | 11/1986 | Welles, II | 340/825.69 |
| 4,626,848 A | | 12/1986 | Ehlers | 340/825.69 |
| 4,746,919 A | * | 5/1988 | Reitmeier | 340/825.69 |
| 4,959,810 A | | 9/1990 | Darbee et al. | 359/148 |
| 5,081,534 A | * | 1/1992 | Geiger et al. | 340/825.69 |
| 5,418,527 A | * | 5/1995 | Yashiro | 340/825.72 |
| 5,566,022 A | | 10/1996 | Segev | 359/172 |
| 5,606,443 A | * | 2/1997 | Sgambati | 340/825.72 |
| 5,710,605 A | * | 1/1998 | Nelson | 348/734 |
| 5,923,268 A | | 7/1999 | Takahashi et al. | 172/450 |
| 5,953,144 A | | 9/1999 | Darbee et al. | 359/148 |
| 6,040,829 A | | 3/2000 | Croy et al. | 345/864 |

FOREIGN PATENT DOCUMENTS

GB    2 275 800    9/1994

* cited by examiner

*Primary Examiner*—Donnie L. Crosland
(74) *Attorney, Agent, or Firm*—Mark R. Galis; Gary R. Jarosik

(57) ABSTRACT

A media system capable of sending a plurality of input signals to a receiving device of the system is provided. A remote control for selecting among the input devices is also provided. An audio remote without numeric keys for an audio system is provided. The present apparatus also provides the user with the ability to control the output of an input selection key. This allows the user to select input source, perhaps from a table, or execute a function assigned to the key. When in a "locked" state, the input key will rotate through a table that contains individual input functions from target devices, or the target sources/devices. The table may consist of as many input functions are as available for each device. In an "unlocked" state the remote will attempt to send a function assigned to the input key prior to selecting a device selection from an input select table. Other features of a remote control for a media system are provided.

23 Claims, 15 Drawing Sheets

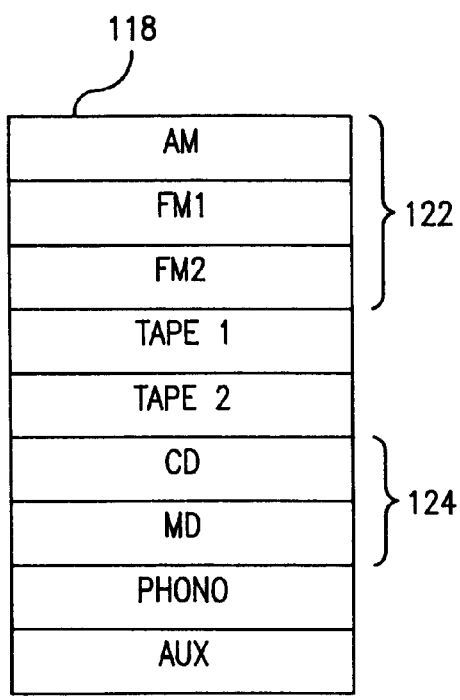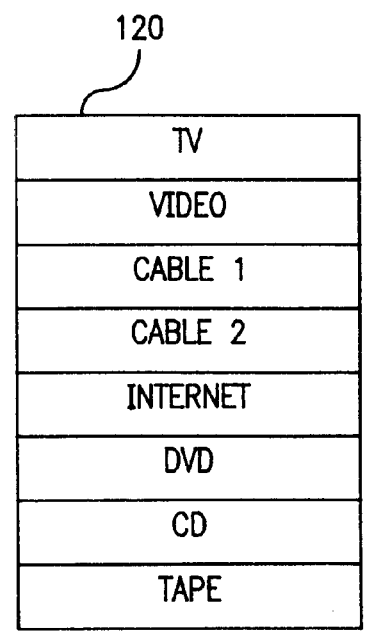
FIG. 7
FIG. 8

| HARDWARE DESCRIPTION | CONFIGURATION |
|---|---|
| Crystal IR Carrier Operation | No |
| LCD (Segmented, Pixel), Backlight (LED, EL) | No |
| IR LEDs (1,2) (W, WW, WN) [Wide, Narrow] | 1W |
| Learning (UEI) | Yes |
| Lighted Keypad (LED, EL), Color | No |
| Low Voltage Detection | Yes |
| Mode Indicator LEDs | No |
| Modem | No |
| PCB Material (Paper, FR4), Other | Paper |
| PCB Type (Single Sided, Double Sided, Silver thru holes, etc.) | Single |
| Download Upgrade Interface Port (3 Pin) | No |
| Download Upgrade Interface Port (6 Pin) (6 Pin E2 Interface) | Yes |
| Download Upgrade Interface Port Opening | Yes |
| RAM Retention | N/A |
| RF Operation | No |
| RF Finder | No |
| Visible LEDs for user feedback (2, 3, 5mm) (Red, Green) | 1; red; 2 mm |
| 3 or 6 volt Operation (AAA, AA) | 3 volt, 2 AAA |

FIG. 9

| FUNCTION DESCRIPTION | STATUS |
|---|---|
| Device Mode Keys<br>a) Tuner<br>b) CD<br>c) Tape<br>d) MD<br>e) Total Number of Device Mode Keys<br>f) Group Modes to single Key(s) | Yes<br>Yes<br>Yes<br>Yes<br>4<br>Yes |
| Total Number of Keys in Software | 17 |
| Dual Functional via Shift (or Magic) Key<br>One Time Use | Yes |
| E2 Auto-Sizing | Yes |
| E2 Upgradeable via 6 pin Interface | Yes |
| Factory Test Mode | Yes |
| Functional Keys -- Standard | Yes |
| High Frequency Capable up to 450KHz | Yes |
| ID Code Verification (443) | Yes |
| ID Default Selection | Yes |
| ID Lock/Unlcock for Specific Mode | Yes |
| ID - Number of Digits | 6 |
| ID Offset<br>Offset by Hardware setting (Jumper, . . .) | Yes |

FIG. 10A

| | |
|---|---|
| Mode Reassignment (441) | Yes |
| Power Up w/Default Device Mode and Codes | Yes |
| Punch Through to Last Device (by Key Group) | Yes |
| Reset to Defaults<br>a) Operational Reset (412)<br>b) Manufacturing Reset (411) | Yes<br>Yes |
| Set Up – MAGIC | Yes |
| Simultaneous Double Key Press – Standard Action | Yes |
| Simulataneous Double Key Press – Alternative Action | Test Mode |
| Step and Set (444) | Yes |
| Stuck key Time-Out | Yes |
| Visible LED – for user feedback | Yes |
| Volume Lock (431) | Yes |
| Offsets Via Jumper | Yes |
| Learning (421) | Yes |

FIG. 10B

| |
|---|
| Channel Scan |
| Channel +/− Simulation w/Lock Option |
| Channel Lock |
| Color/Brightness Control |
| Dual Functional via Shift Key<br>a) One Time Use<br>b) Shift Lock w/Time-Out |
| E2 Device Mode Lock |
| E2 Upgradeable via Modem (997) |
| Favorite Channel Scan (996) |
| Home Theater |
| ID Offset<br>a) Constant number offset to all ids<br>b) Custom renumbering to some or all ids |
| Illuminated Key Pad |
| Keymover (994) − Full with Synthesizer |
| Liquid Crystal Display (LCD) |
| Low Voltage Detection − Software |
| Macros<br>a) Hard Coded<br>b) Premium Channel<br>c) User Defined<br>    1) Single<br>    2) Multi-level Rotating |

FIG. 11A

| Menu |
|---|
| Modem |
| Network Downloading |
| Power On Mode Key |
| Power Toggle |
| Power Up w/No Defaults |
| Quickstep |
| Record Safety |
| Remote Finder with Lock Option |
| Set Up – Other than MAGIC |
| Simultaneous Double Key Press – Alternative Active |
| Sleep Feature via UEI w/Lock Option |
| Synthesizer |
| Visible LED – for mode indication |
| Teletext |
| Fastext |
| Tilt Switch |

FIG. 11B

|  | Key Type | Pick Philosophy | TUN | CD | TAPE | MD |
| --- | --- | --- | --- | --- | --- | --- |
| MODE |  |  | AMP/TUNER, AMP, MISC, AUDIO | CD | AUDIO CASSETTES | MD |
| KEY LABEL |  |  |  |  |  |  |
| TUN | Device | None | TUN | ---- | ---- | ---- |
| CD | Device | None | ---- | CD | ---- | ---- |
| TAPE | Device | None | ---- | ---- | TAPE |  |
| MD | Device | None | ---- | ---- | ---- | MD |
| PWR | Primary | Match | PWR | PWR, Open/Close | PWR | PWR, Open/Close |
| CHANNEL UP | Dual | Similar | Preset Up | Track Up | Punch Through (3) | Track Up |
| CHANNEL DOWN | Dual | Similar | Preset Down | Track Down | Punch Through (3) | Track Down |
| <MAGIC> CHANNEL DOWN (4) | Magic Shifted | Similar | Track Down; Tune Down | Disk Skip Down | Punch Through (3) | Disk Skip Down |
| VOLUME UP | Dual | Match | Volume Up | Volume Up | Punch Through (3) | Volume Up |
| Volume Down | Dual | Match | Volume Down | Volume Down | Punch Through (3) | Volume Down |

FIG. 12A

|  | Key Type | Pick Philo-sophy | TUN | CD | TAPE | MD |
|---|---|---|---|---|---|---|
| MODE |  |  | AMP/TUNER, AMP, MISC, AUDIO | CD | AUDIO CASSETTES | MD |
| KEY LABEL |  |  |  |  |  |  |
| MUTE | Dual | Match | Mute | Mute | Punch Through (3) | Mute |
| PLAY | Primary | Similar | CD Play;Play (2) | Play (2) | Play (2) | Play (2) |
| <MAGIC> Play (4) | Magic Shifted | Match | Record | Record | Record | Record |
| STOP | Primary | Match | CD Stop;Stop (2) | Stop (2) | Stop (2) | Stop (2) |
| REWIND | Dual | Similar | CD Search Reverse Rewind (2) | Search Reverse (2) | Rewind (2) | Search Reverse (2) |
| FAST FORWARD | Dual | Similar | CD Search Forward; Fast Forward | Search Forward (2) | Fast Forward (2) | Search Forward (2) |
| PAUSE | Primary | Match | CD Pause; Pause (2) | Pause (2) | Pause (2) | Pause (2) |
| FUNCTION (Locked) | Dual | Similar | Input Select Table (3) | Punch Through (3) | Punch Through (3) | Punch Through (3) |
| FUNCTION (Unlocked) | Dual | Similar | Input (1) (3) | Punch Through (3) | Punch Through (3) | Punch Through (3) |

FIG. 12B

| Number | Key | Description |
| --- | --- | --- |
| 1 | POWER | Power |
| 2 | MAGIC | UEI Programming Key |
| 3 | TUN | Device Mode Key – no IR |
| 4 | CD | Device Mode Key – no IR |
| 5 | TAPE | Device Mode Key – no IR |
| 6 | MD | Device Mode Key – no IR |
| 7 | CHANNEL UP | Tune Up (Digit 3 in programming mode) |
| 8 | CHANNEL DOWN | Tune Down (Digit 4 in programming mode) |
| 9 | VOLUME UP | Volume Up (Digit 1 in programming mode) |
| 10 | VOLUME DOWN | Volume Down (Digit 2 in programming mode) |
| 11 | MUTE | Mute (Digit 5 in programming mode) |
| 12 | PLAY | Play |
| 13 | STOP | Stop |
| 14 | REWIND | Rewind |
| 15 | FAST FORWARD | Fast Forward |
| 16 | PAUSE | Pause |
| 17 | FUNCTION | Input Select |

FIG. 13

| Mode | Load/Device Assignment |
| --- | --- |
| TUN | Amp/Tuner, Amp, CD, MD, Misc. Audio |
| CD | CD, MD, Amp/Tuner, Amp, Misc. Audio |
| TAPE | Audio Cassettes |
| MD | CD, MD, Amp/Tuner, Amp Misc. Audio |

FIG. 14

MEDIA SYSTEM AND REMOTE CONTROL FOR SAME

BACKGROUND OF THE INVENTION

The present invention relates to a media system, and in particular an entertainment system. Embodiments of the invention relate to a remote control of the type which is hand held and which can be coupled via coded infrared signals with a remote control receiver built into one of the components of the entertainment system. The remote control allows the remote control receiver to turn on the component, or apparatus, at a distance, to adjust the volume, tone, and brightness, to change channels, to turn the apparatus off and to perform other functions.

Heretofore it has been proposed to provide a reconfigurable remote control device and programmable functions for such a remote control which will enable one to learn, store and transmit infrared codes that are emitted from the remote control device for a remotely controlled apparatus. For example in the Wells 2 U.S. Pat. No. 4,623,887 and the Ehlers U.S. Pat. No. 4,626,848, there is disclosed a reconfigurable remote control device which has the ability to learn, store and repeat remote control codes from any infrared transmitter. Such a reconfigurable remote control transmitter device includes an infrared receiver, a microprocessor, a non-volatile random access memory (RAM), a scratch pad random access memory, and an infrared transmitter. According to the teachers of the Ehlers patent, the infrared signals received by the remote control device are bursts of pulses and the device counts the number of pulses in each burst as well as the time duration of each pulse in a transmission between bursts.

U.S. Pat. No. 4,959,810, by Darby et al. discloses a universal remote control device having terminals for enabling code data to be supplied from outside the device to the terminals in the CPU to a RAM or ROM in the device.

The hand held remote controls of necessity have a finite number of keys and, because of the diversity of possible target devices, cannot offer a dedicated key for every possible function or feature. Accordingly, dedicated keys are generally only provided for those functions which are common to almost all devices (e.g. power, volume, channel up-down, etc.).

Also of interest is U.S. Pat. No. 5,566,022 by Segev. U.S. Pat. No. '022 discloses a infrared communication system including a plurality of infrared transceivers for receiving and transmitting infrared signals through the free air. Each transceiver includes an omnidirectional infrared receiver for receiving infrared signals; an omni-directional infrared transmitter for transmitting infrared signals; and a controller which determines the direction of arrival and the quality of the signals received by the infrared receiver, and controls the respective infrared transmitter in accordance therewith.

SUMMARY OF THE INVENTION

The present invention includes a media system and a remote control for a media system. The media system includes a receiving device connected to receive one of at least two input sources, and at least one input device which is connected to provide, or function as, at least one of the two input sources. The remote control includes a hand held case including a receiver mode key and input system mode keys. The remote also includes a plurality of device control keys and a function key. A first means is provided for placing the remote control in a receiver system mode such that operation of the plurality of device control keys will effect operation of the receiving device. Select means for selecting the input source for the receiving device is also provided.

A remote control is provided which is adapted to effect operation of a receiver device. The receiver is adapted to receive a plurality of signals from input sources. The signals include signals from input devices. Other input sources may be radio and television signals, and the like. The remote is further adapted to effect operation of first, second and third input devices. The remote includes a case having a receiver key, and first, second and third device keys. Each key is operably connected to activate a corresponding receiver mode, and first, second, and third device modes. The case further includes a plurality of device control keys operably connected to effectuate responses in the receiver, and the first, second, and third devices when in a respective corresponding mode. For example, the device keys will control the first device when the remote/system is in the first device mode. The remote may be placed in the first device mode by depressing the first device mode key. Other means for effecting same are discussed below. The case will also include a function key operably connected to select one of the input sources. This input source is preferably selected from an input select table. The input select table may contain the input devices and other input sources.

The present invention also provides an improved media system. The media system includes a receiver device, and first and second input devices. The receiver device is adapted to receive a plurality of input signals. The first and second input devices are connected to supply respective input signals to the receiver. A remote control is programmed to effectuate responses in the receiver device, and the first and second input devices. The remote control includes a receiver mode key, a first input mode key, and a second input mode key. Mode programming, which is responsive to the mode keys, is programmed to activate corresponding modes in the remote control. Select programming is programmed to effectuate configuration responses in the receiver device. In some applications benefits are achieved by activating both mode programming and select programming with a single key stroke. The select programming includes an input-select table including the first and second input devices. The receiver device may then be configured to receive a selected input signal from one of the input devices, or other input sources, in the input select table. The remote may also include a function key, wherein the select programming is responsive to the function key. Operation of the function key may then be used to effectuate configuration responses in the receiver when the corresponding mode is active.

The media system may be optimized for a particular application. In one application the media system is an audio system and the receiver is a tuner. The input devices may, for example, be compact disc players, tape deck, and the like.

In another embodiment of the invention, the remote control provided includes signal generating circuitry. The function key is operably connected to the signal generating circuitry. The signal generating circuitry generates a receiver configuration signal to configure a receiver to receive input from one of the input sources.

Accordingly, one object of the present invention is to provide a simplified remote control.

Another object of the present invention is to provide a non-numeric remote for an audio system.

Another object is to provide input selection on the remote via a single key, even when the device does not support single key input. For instance, a single remote key can replace multiple discrete device input selection keys.

Yet another object is to provide means for managing a media system. A further object is to manage the media system by providing a convenient method, and device, for managing input sources.

Other objects and advantages of the present invention will be apparent from the following detailed discussion of preferred embodiments with reference to the attached drawings and claims.

BRIEF DESCRIPTION OF THE DRAWINGS

In the attached drawings, described briefly below, generally only enough of the invention is illustrated to enable one of skill in the art to practice the invention without undue experimentation.

FIG. 7 shows an input select table such as may be used in the flowchart shown in FIG. 5 or 6.

FIG. 8 shows an input select table similar to that shown in FIG. 7 however including multi-media input devices.

FIG. 9 shows a hardware description for a remote control according to the present invention.

FIG. 10a shows a software configuration for a remote control according to the present invention.

FIG. 10b is a continuation of the software configuration shown in FIG. 10a.

FIG. 11a shows exemplary options for an audio remote according to the present invention.

FIG. 11b shows a continuation of the table shown in FIG. 11a.

FIG. 12a depicts a functional keychart of an audio remote according to the present invention.

FIG. 12b shows a continuation of the functional keychart shown in FIG. 12a.

FIG. 13 shows a physical key designation and description for a audio remote according to the present invention.

FIG. 14 shows a mode mapping table for the audio remote according to the present invention.

FIGS. 15A and 15B show a detailed schematic circuit diagram of a preferred embodiment, wherein FIG. 15B is a continuation of FIG. 15A.

DESCRIPTION OF PREFERRED EMBODIMENTS

Figure 1:
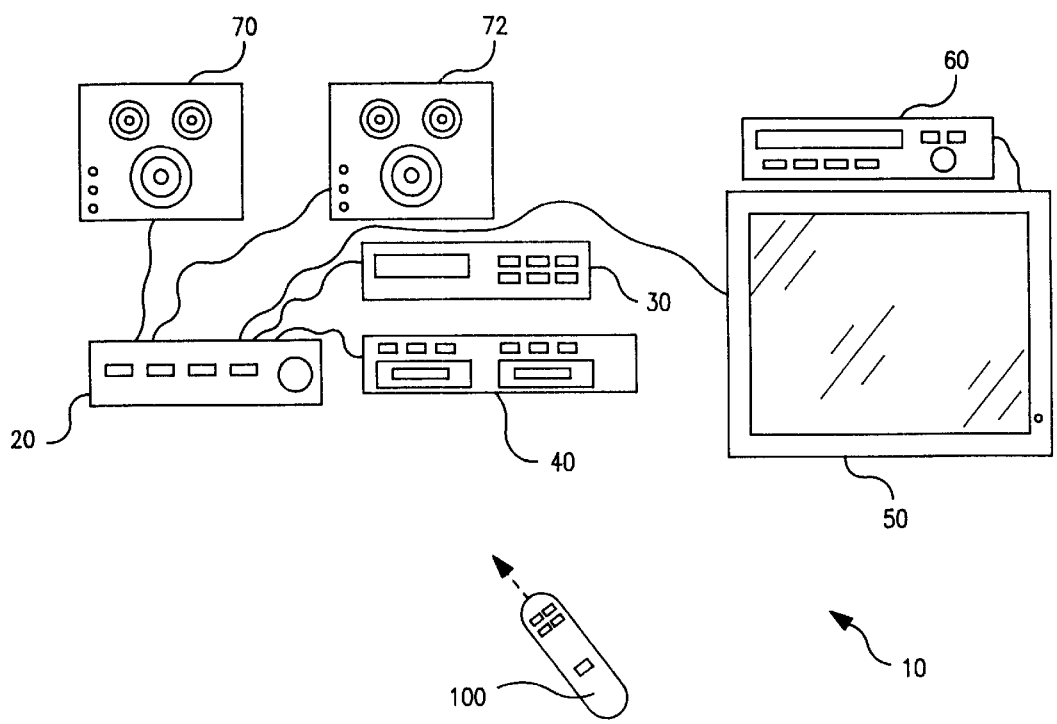
FIG. 1 shows a schematic of a media system according to the present invention.

The present invention will be understood more clearly from the following detailed description of exemplary embodiments of the invention with reference to the attached drawings wherein like reference numerals refer to like parts.

Generally, the invention relates to media systems such as the media system 10 shown in FIG. 1. The media system 10 shown in FIG. 1 includes a receiver 20, a first input device 30, a second input device 40, a third input device 50, and a fourth input device 60. The media system 10 also includes a remote control 100. The receiver 20, in one embodiment, may be a tuner, amplifier, audio-mixer, or the like. In the embodiment shown in FIG. 1 the receiver 20, also referred to herein generally as a tuner, is connected to output speakers 70 and 72.

The first input device 30 is as a compact disc (CD) player, the second input device 40 is a dual tape player, and the third input device 50 is a multi-media device. The third input device 50 is connected to the fourth input device 60, which is a video player. The invention is not limited to the specific devices which have been described. Other input sources are acceptable. Likewise, it will be understood that an input device may also act as a receiving device, as in the case of the third input device 50 receiving input from the fourth input device 60. Thus reference to tuners, receivers, and input devices is used for convenience only and not intended to limit the function of the device unless indicated otherwise. The input devices function as input sources providing respective input signals to a receiver such as receiver 20.

Figure 2:
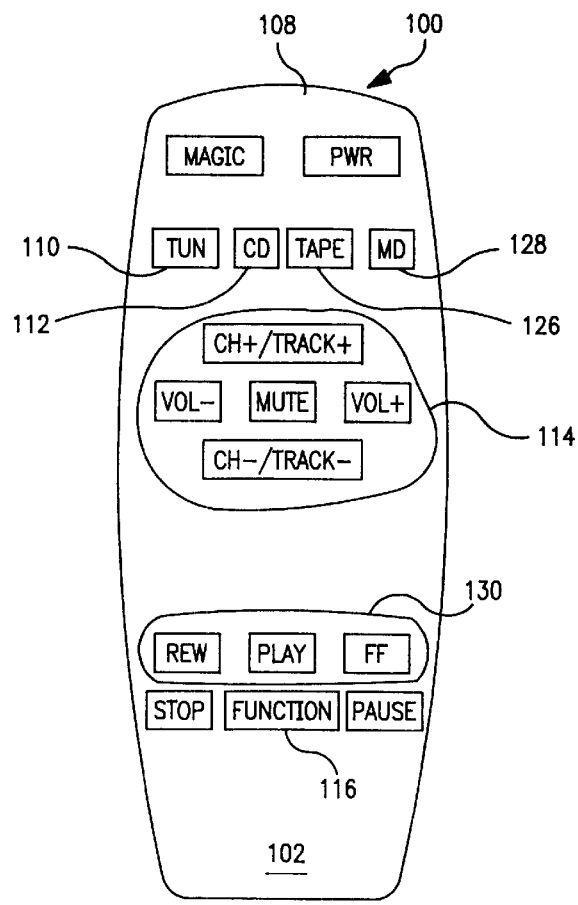
FIG. 2 shows a front view of a hand held remote control for controlling the media system shown in FIG. 1.
Figure 3:
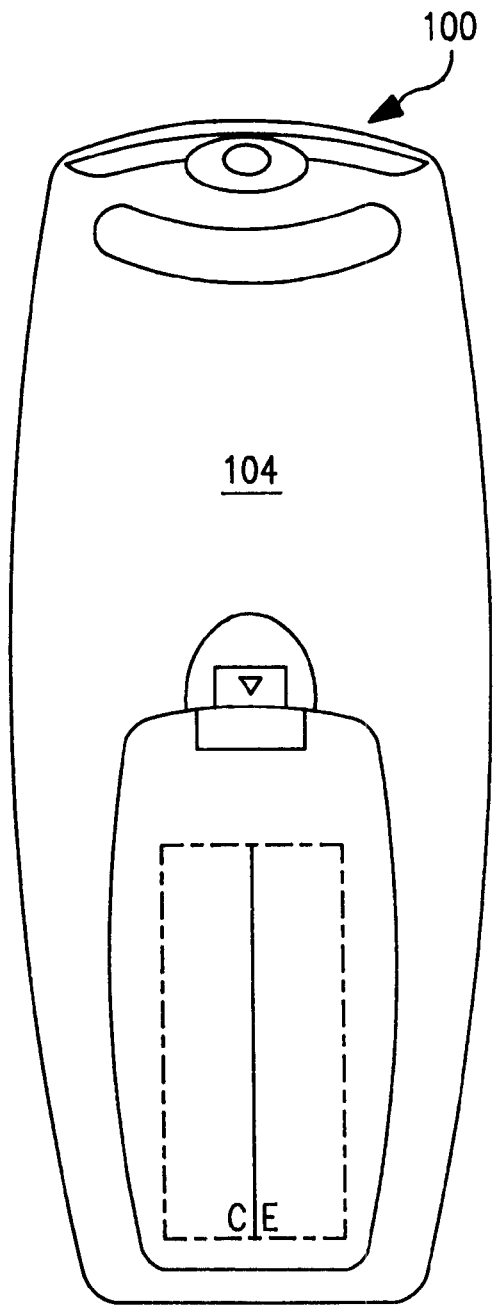
FIG. 3 shows the back view of a hand held remote control according to the present invention.
Figure 4:
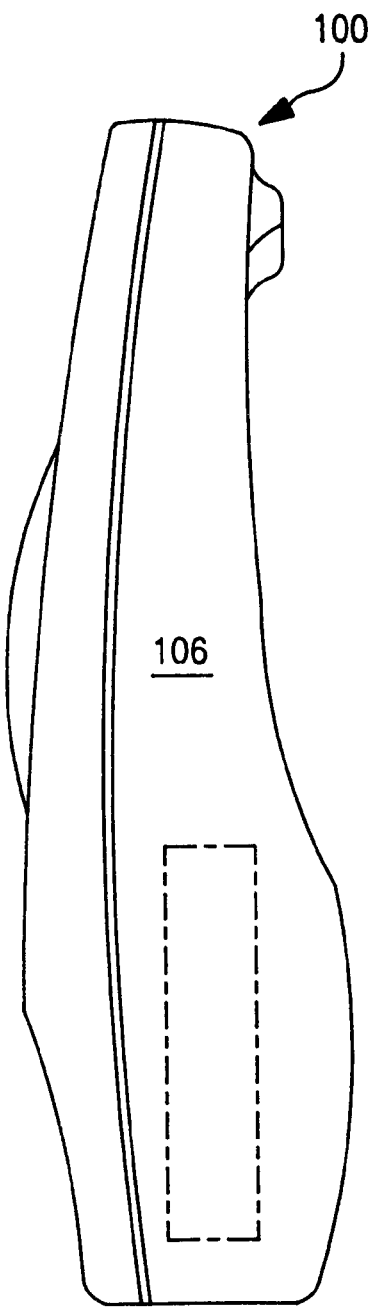
FIG. 4 shows a side view of the remote control shown in FIG. 3.

FIGS. 2, 3 and 4 show front, back and side views of the remote control 100. FIG. 2 shows the front 102 of the remote control 100; FIG. 3 shows the back 104; and FIG. 4 shows a side 106 of the remote control 100. Preferably, the remote control 100 is a hand held case (or device) 108, which has front 102, back 104 and side 106. The hand held case 108 shown in FIG. 2 includes a receiver system mode key 110 and an input device system mode key 112. The component system mode keys are also referred to as mode keys, or receiver and device keys where convenient. The hand held case 108 also includes a plurality of device control keys 114 and a function key 116.

The remote control 100 includes a first means, which will be described in more detail below, for placing the remote control 100 in a receiver system mode. In the receiver system mode, operation of the plurality of device keys 114 will affect operation of the receiver 20. For example, the volume may be adjusted, etc. The first means may also be used to alter the system mode to other desired modes.

Select means, described in more detail below, for selecting an input source, e.g. one input source, the receiving device will receive is also included in the remote control 100. For example, a tuner may be set to "CD" to receive input from the CD, or set to "FM" to receive a frequency modulated radio signal, etc. Though the receiver 20 may be "receiving" a given input source in a broad sense when not in a corresponding configuration, that is not the intended meaning of the term as used herein. The term "receiving," in the context of a receiver configuration, implies that the receiver is configured to "play" the input signal, i.e. pass it on to speakers, mixers, etc. The select means allows the one input source to be selected, from a plurality of input sources, upon operation of the function key 116.

Figure 5:
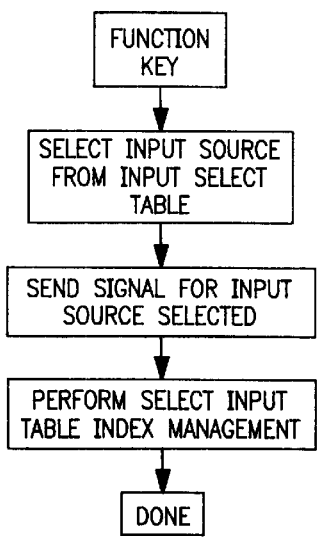
FIG. 5 shows a flow chart for managing input device selection.
Figure 6:
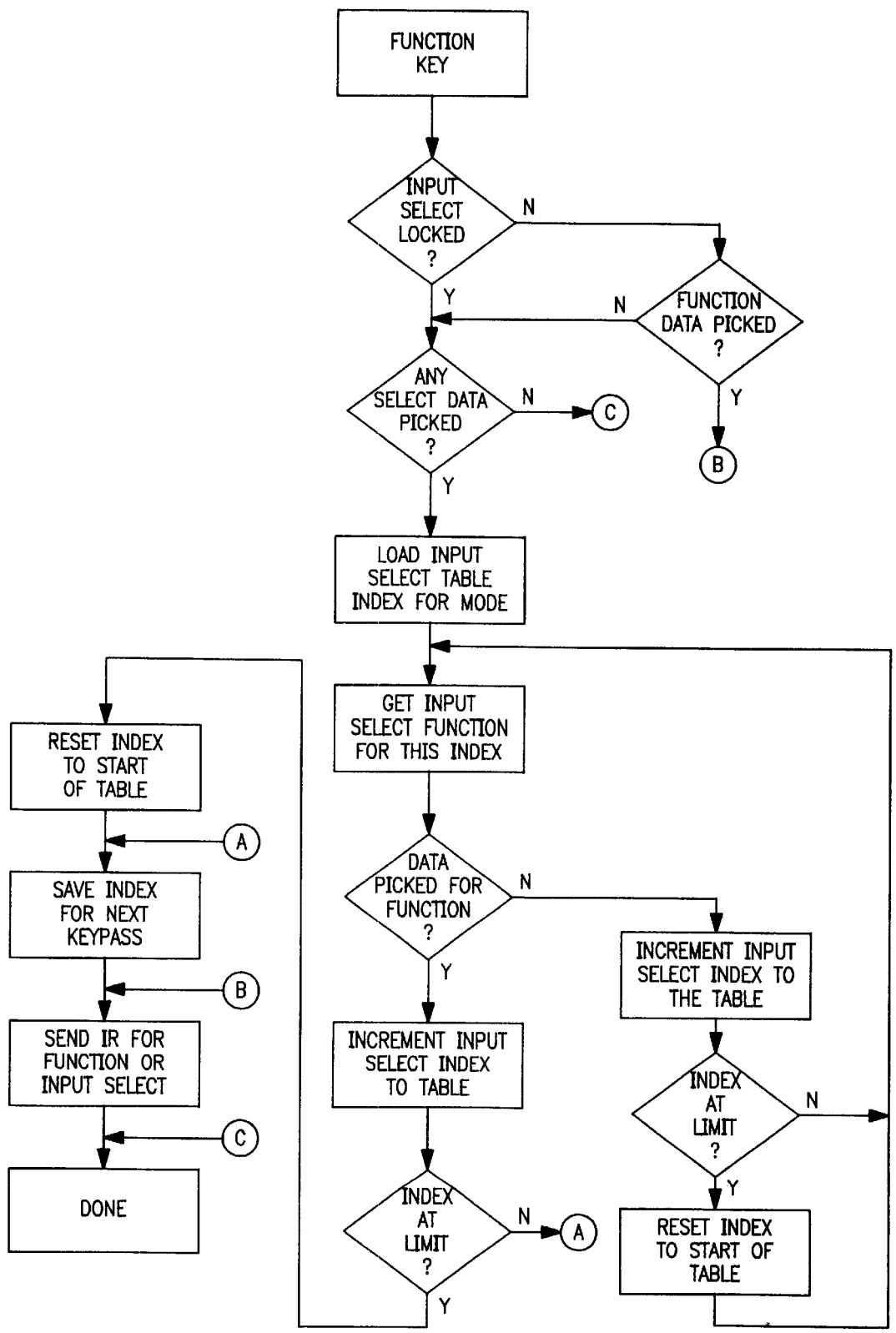
FIG. 6 shows a variation of the input device management flow chart shown in FIG. 5 which is more detailed.

FIGS. 5 and 6 show top level flow charts depicting exemplary processes for selecting an input source. In FIG. 5 select-input-table index management occurs after the receiver is configured. FIG. 6 is a more detailed variation of the flow chart in FIG. 5. In FIG. 6, the select-input-table index management occurs prior to sending infrared (IR) signal which will configure the receiver to receive the corresponding selected input source.

In one embodiment the input select function is implemented as a mode dependent function. This means that the input select function "lock" status exists as a unique state for each of the system modes or supported modes. If the input select function is locked for a particular mode, the system will go directly to the input select table for that mode, when the function key is pressed.

When the input select is unlocked, a default state in a prefigured embodiment, the system will try to send data assigned to the function key upon depressing it. This data generally corresponds to device control functions assigned to the function key. Other functions, such as configuration changes, may also be assigned to the function key. If no data has been picked for, or assigned to, the function key, the system will then try to send data corresponding to an input source selected from the input select table. The data in the table from the function key selects need not be limited to "input source" data.

The select means may also include means for selecting an input from an input select table in response to operation of the function key if no data is assigned to the function key. No data assigned to the function key generally implies that no control device functions have been assigned to the function key. The default state for one embodiment is "unlocked." Accordingly, the select means will attempt to send data assigned to the function key before attempting to select from the input select table.

The input-select-table generally corresponds to the ID set up for the current active mode. A device typically has an ID code for its particular type, make, and mode. Loading the ID code provides the remote with information to control that particular device. The ID code may correspond to a database having only the "available functions" to be controlled, or the exact signal parameters which must be sent to effectuate a proper response in the device. Such ID coding and databases are well known in the art. For example, a particular ID code may be used to configure the remote control such that operation of the device control keys 114 will effectuate a response in a particular model of a CD player by a particular manufacturer such as the CD player 30. To activate a CD mode, one depresses the CD system mode key 112. Then, to effectuate a response in the CD 30, one merely depresses one of the device control keys 114. Accordingly an input select table is generally associated with a particular mode, although it is perhaps. more correctly associated with a particular device having a particular ID set up. The ID setup is associated with a particular mode via assigning that device to that mode. In the following discussion such distinction is generally not warranted and therefore not made.

The input select data may be sent from the input select table, corresponding to a given mode, in a cyclic fashion. The system starts at the beginning of the table and cycles through to the end of the table (or last entry), returning to the start of the table one entry sent, for each press of the function key. Other equally effective data management techniques will be apparent to those with skill. The maximum table entries may be set at a predetermined number, e.g. ten, however a given ID and device, may have less than ten functions available (or supported). The data in the input select table may, thus, not be contiguous, depending upon which input select functions were picked for the table, or supported, by the device or the combination. "Dead" key presses are key presses where no perceptible response has occurred in the device to be configured. This may result if a null-space in the table were to be selected. To avoid "dead" key presses, the system may be made to send data for the next table entry containing data, as it cycles through the input select table.

When an ID is set up for a particular mode e.g. via ID setup or step-and-set, or a mode reassignment occurs, the modes input-select-table index may be reset to the table's start. This will ensure consistent sequencing when the function key is pressed. The pointer may be different for each table and, therefore may be mode specific.

FIG. 7 shows an input select table 118 such as may be appropriate for use with an audio receiver. FIG. 8 shows an input select table 120 such as may be appropriate for use with a multi-media receiver. Generally the select means comprises an input select table including at least two input sources. In FIG. 7 the input sources include radio sources 122, and digital disc sources 124, such as compact disc (CD) and mini disc (MD) sources. By comparison the multi-media input select table 120 of FIG. 8 comprises audio as well as visual input sources. The input select table may be stored in memory, or input via an external source. As shown in FIG. 6 the select means may include means for incrementing an input select index in response to operation of the function key 116. The index may step down through the table with each press of the function key 116 and a corresponding configuration signal may thereby be sent. The input-select table may also provide a library of control functions and the like, not merely configuration data.

One embodiment of the remote also includes function lock means for toggling the remote control between a function-locked status and a function-unlocked status. The function-locked status is also referred to herein as a locked status. Likewise the function-unlocked status is also referred to herein as an unlocked status.

As can be seen the remote control 100 may be adapted to affect operation of a receiver device 20, and first, second and third input devices (30, 40 and 50), wherein the receiver device 20 is adapted to receive a plurality of signals from input sources. The signals typically include signals from the input devices. The remote control for such an embodiment may include a case 108 including a receiver key 110, first device key 112 and second and third device keys. Referring to FIG. 2, the second and third device keys may be tape and MD keys 126 and 128, respectively. The case 108 shown includes the plurality of device control keys 114. The device control keys 114 are operably connected to effectuate responses in the receiver 20, the first input device 30, the second input device 40, and the third input device 50 when a respective corresponding mode is active. For example when the third input device mode is active, i.e. selected, the device control keys 114 will effect a response in the third input device 50. In this example, the mini disc mode is activated by depressing the MD key. Subsequent operation of the control keys 114, such as mute, will operate on the mini-disc. The case 108 may still further include a function key 116 operably connected to select one of the input sources. The input sources are selected from an input table, such as input table 118 or 120.

In a preferred embodiment the system includes input select programming stored in memory and responsive to operation of the function key 116. The select programming includes input-select-table index management programming. The index management programming is responsive to operation of the function key of 116. The remote control 100 may also include. a plurality of input select tables stored in memory. Preferably at least one input select table corresponds to at least one each of the input devices and the receiver. However, the input select tables may alternatively correspond to the respective modes associated with the mode keys.

In the media system 10 shown in FIG. 1, the receiver 20 is adapted to receive a plurality of input signals (not shown).

First and second input devices 30 or 40 are connected to supply the respective input signals to the receiver 20. Mode programming, preferably stored in memory, is responsive to the mode keys, e.g. first input mode key 112, and programmed to activate corresponding modes.

Select programming is provided and includes an input-select table having the first and second input devices 30 and 40. The select programming is programmed to effectuate configuration responses in the receiver device 20. The receiver device 20 is then configured to receive a selected input signal wherein the selected input signal is from one of the input devices 30 or 40. The select programming is also responsive to the function key 116. Operation of the function key 116 will thereby effectuate configuration responses in the receiver 20 when a corresponding mode is active. The select programming may be responsive to the mode keys such that operation of the first input mode key 112 activates the corresponding mode and configures the receiver 20 to receive the selected input signal e.g. the signal from the first input device. Thus the selected input signal from the first input device will be received by the receiver merely by selecting the first input mode key.

In one embodiment, a remote control is provided which comprises mode keys including a receiver mode key, a first input mode key and a second input mode key. Mode programming which is responsive to the mode keys is provided. The mode programming may be programmed to activate the corresponding modes upon operation of the corresponding mode keys. The remote control also includes signal generating circuitry and a function key operably connected to the signal generating circuitry. Select programming is also provided. The select programming has an input-select table including a plurality input sources. The input sources include first and second input sources. The signal generating circuitry generates a receiver configuration signal to configure the receiver to receive input from one of the plurality of input sources. The select programming is preferably responsive to the function key. The select programming may step through the input-select table in response to the function key.

The select programming may also include a plurality of input-select tables. Preferably at least one of the input-select tables corresponds to each mode. Generally each input select table includes a pointer, or index, respectively corresponding to each mode. The select programming may be responsive to the mode keys such that a first input receiver configuration signal is generated in response to operation of the first input mode key. Preferably the select programming includes select-input table index management programming. The select-input table index management programming may increment an index in response to operation of the function key.

In one embodiment a key group 130 is connected to the signal generating circuitry (not shown). The keys of the key group 130 correspond to the respective functions supported by first input device 30. For example, the rewind and fast forward keys shown in FIG. 2 may be supported by a CD player or a tape player, but would not be supported by a phonograph or a record player. The mode programming may be made responsive to the key group 130 such that when in the second input mode, where the key group functions are not supported by the corresponding device, operation of one of the key groups will activate the first input mode. The first input device is then "selected" and "controlled" by execution of a single key, or of the "non-functioning" keys. This is similar to "punch-through" discussed below.

One object of the present invention is to provide a remote control for an audio system. The remote control is a four-device non digital remote control; i.e. it supports four devices and does not have any numbered keys. The remote control will operate the basic functions of amplifiers, tuners, cassette tapes, CD players, and mini disc players. It may contain 17 keys. The remote control may be provided with an integrated circuit. One preferred integrated circuit is the microcontroller part number KS88C01424P available from Samsung Electronics.

The remote may be capable of controlling more configurations than are supported by a given device. This is generally not a significant disadvantage. Learning capability is provided to avoid the reverse situation, though.

A learner feature may be added as a safeguard against missing, or non-working codes. The learner will also offer the consumer the opportunity to add extra functions.

FIG. 9 depicts a preferred hardware configuration for one audio remote. FIGS. 10a and 10b show a preferred software configuration.

FIGS. 11a and 11b show exemplary optional software features; the list is not all inclusive and is only intended as indication of the number of different variations available. Other features will be apparent to those with skill in the art. FIGS. 12a and 12b show a functional key chart for one preferred embodiment. The following notes apply to the tables in FIGS. 12a and 12b:

(1) If a single Input select function is not picked for any given ID, this function will default to the locked state and rotate through the input select table.

(2) If CD or Audio Cassette transport functions are not picked, these keys shall punch through to the previously selected mode that contains picked functions for these keys.

(3)
  1st) Send IR for single Input select, or
  2nd) Rotate through Input Table, or
  3rd) Punch to previously selected mode. If there is no pick for that mode's function, no IR is sent.

(4) When using Magic as a shift key, the unit will remain in the <Magic> shifted state for 5 seconds after the last key press for CH+(Track+), CH−(Track−), Play (Record).

LED's may be provided as mode indicators depending on the preferred application. Jumpers for operating multiple devices may also be provided. It may be desirable to provide the remote control with upgrade capability, such as the capability to upgrade to a 1 k EEPROM, etc.

The firmware may have the ability to determine the size of the EEPROM, also referred to as $E^2$, installed on the printed circuit board (PCB). The five common $E^2$ sizes, in bytes, are 128, 256, 512, 1 k, and 2 k.

The remote may be placed into a factory test mode within the first six seconds of applying power to the remote by pressing two keys, (e.g. FF and REW). Once entered, every key will produce a unique IR data output. The IR will start sending with a key press and continue sending as long as the key is held down. The software may utilize a code such as a Sony T00000 code. The remote control will remain in factory test mode for 30 seconds, after which the remote control returns to the normal default state. The factory thus does not have to do a reset and the factory test mode need not be recorded in $E^2$. Pressing the two keys after the six second period will have no effect. Removing the battery and pressing a key returns the remote to normal state upon next power-up.

Factory test mode can be re-entered, if needed, by removing the batteries and pressing a key on the remote then followed by the above procedure. Pressing a key with the batteries removed, insures that the remote will enter the low voltage detection (LVD) state.

It may be desirable to provide the remote with high frequency IR. Samsung micro controllers are capable of operating up to 450 k carrier frequencies and are acceptable for most applications.

The device ID code for a mode may be verified as follows.

Mode <<Magic>> 4-4-3-1(count blinks)-2(count blinks)-3(count blinks)-4(count blinks)-5(count blinks)-6 (count blinks).

The number of blinks counted after pressing each digit 1, 2, 3, 4, 5, and 6 key shall represent the 6 digit device ID code for the selected mode beginning with the left most digit. The delayed start of blink out shall be 0.5 seconds with a 0.5 second delay after each key press for 1, 2, 3, 4, 5, and 6. The remote shall exit the ID code verification state, when, after performing the sequence 4-4-3, the user presses any key other than digit 1. If the sequence of pressing digit 1, 2, 3, 4, 5, and 6 for counting blinks is not maintained, the remote shall exit the ID code verification state. Operation and error state shall be marked by the LED emitting a long blink. The unit shall time out after 10 seconds during programming.

Customized default device ID codes per mode may be specified by the customer when the basic defaults are not desired. The customized defaults may be implemented by either software design, jumper, or $E^2$ flag. Defaults may also be "fixed" if directed by the customer, otherwise, the user may be able to change the ID codes as needed.

After a valid ID code has been set, the ID code for a specific mode may be locked and unlocked as follows:

Mode <<Magic>> 4-4-2

The unit will blink two times upon being locked and blink four times when unlocked. The unit may be set to time out after 10 seconds during programming. The default state may be the unlocked state. Step-and-set and Mode Reassignment are generally not allowed for a specific mode that is locked.

Generally, each ID code, or set up code, consists of six digits using a base 4 and may be defined in an external database.

A learning feature may be used as a supplement to a standard pre-programmed library. The standard RAM library provides most of the functions needed. However, a user can add a number of additional functions of his choice. The learning operation may be executed as follows:
1. <<Magic>> 4-2-1 to initiate learning mode.
2. On the learning remote, press [Mode] [Magic] then the [learning key] which will learn the new signal (time-out if no key pressed in 10 seconds).
3. Visible LED will flash rapidly (time-out if no received signal detected in 5 sec).
4. Hold the teaching remote close to the IR LED and press the key which will teach the signal to be learned by the learning remote.
5. Visible LED will go out. Continue to press the teaching key until double blink from visible LED.
6. Repeat steps 2 through 5 as often as desired (up to limit of memory).
7. Exit learning mode by pressing <<Magic>>, or time-out (10 seconds). LED should blink four times when exiting.

The system may be set up such that at step 5 one long blink indicates a learning failure. A learning failure could be due to bad capture (try again); memory full (delete some other function); or an unlearnable code. If at step 1 one long blink occurs, a faulty $E^2$ has been detected.

To delete a learned code, either override it with a new code on the same key, or use the below sequence:

<<Magic>> 4-2-2 [mode] [Magic] (key) to be deleted.

The execution of the following will delete all of the learned functions.

<<Magic>> 4-1-2 <<Magic>> 4-1-1.

If a function is learned onto a Key, then the Magic-Key will send the Key's original assigned function. If there already exists a picked (assigned) function in the software that is magic shifted, however, the original Key will not be re-assigned to Magic-Key. Likewise, re-assignment will not occur if something else has been learned or key moved onto the "shifted" key. If a function is learned on a physical Key and there is another function located on the same physical Key shifted by Magic, then the original function will be replaced by the learned function and not moved to Magic shifted. The prior function picked in the software that has been Magic shifted shall remain. Other programming variations will be acceptable too.

Preferably the source and target remote should be no more than two inches apart during the learning event. The learning event, or sequence, should be conducted at low levels of natural light or fluorescent lights. Generally a learner will support IR codes with frequencies up to 135 k without requiring specialized software. In order to perform a sequence, one may teach each function to its own key and then program a macro to use the keys.

It may be desirable to have low voltage detection controlled by hardware. The low voltage condition will then be recognized by the software as an external reset. The unit may be set to blink twice when the low voltage condition is initially reached. While in the low voltage condition, the unit will not operate.

Program target device codes, e.g. input device codes, may be saved in memory upon power outage or battery removal for, e.g., a minimum of five minutes (though typically 10 minutes) without $E^2$. Saving time may be greater depending upon the particular hardware being used. The device code set up and $E^2$ products may be permanently retained.

To reduce battery wear, the remote will stop transmitting IR if any key is depressed longer than 30 seconds.

A mode reassignment feature may be used to change a selected device Mode Key to a desired device Mode Key. For example, the MD device mode key (destination mode) could be changed to an additional TUN device mode key (source mode) to facilitate the operation of two different TUN devices. To place the default TUN code or the presently existing TUN code into the MD mode key follow the below procedure:

<<Magic>> 4-4-1 Source Mode, Destination Mode

The ID (and therefore associated code data) in the destination mode will now be the previous ID of the source mode. The unit will blink two times after successful completion of the programming sequence. The unit may be configured to time-out after 10 seconds during programming.

In an initial power-up the remote may be configured to default to the TUN mode. When in the TUN mode, designated key groups which have no function in the current device mode, may operate for "punch through to" the last device selected. The keys punch through in a group and not individually. The standard key group for punch through is:

Play, Pause, Stop, Rewind, Fast Forward.

Other "key group punch through" operations will be apparent from the teachings herein.

Operational Reset may be used to clear all setup features not related to an ID code setup. Such features may include Volume Toggle, Learned Keys, and $E^2$ information related to these features. The sequence is:

<<Magic>> 4-1-2.

The units LED may be configured to blink two times after successful completion of the programming sequence. The unit may again be set to time out after 10 seconds of programming.

A Manufacturing Reset feature functions the same as the Operational Reset with the exception that the remote resets to the default ID and additionally clears all EEPROM data, including all upgrade codes. The manufacturing reset may be executed by:

<<Magic>> 4-1-1.

The unit's LED may be configured to blink two times followed by a short delay then blink two more times after successful completion of the programming sequence.

Set up using the Magic key is as follows. The six digit target device ID code obtained by a user may be programmed as follows:

Mode <<Magic>> Digit-Digit-Digit-Digit-Digit-Digit.

Referring to FIG. 13, the digit functions are assigned as follows:

| | | |
|---|---|---|
| | VOLUME UP | 1 |
| | VOLUME DOWN | 2 |
| | CHANNEL UP | 3 |
| | CHANNEL DOWN | 4 |
| | MUTE | 5 |
| | PLAY | 6 |

After releasing the Magic key, the LED may be set to blink two times for verification. The LED shall blink once after each digit entry except for the last digit and shall blink two times to confirm that a valid code has been programmed. The unit shall turn off the LED, automatically exiting the programming mode and return to the idle mode. The last program mode will be restored under two conditions: 1) when the six digit code is not entered within 10 seconds, and 2) when an invalid code is entered upon which the LED shall display a long blink. The programming mode shall be exited at any time by pressing any key other than the digit key.

To conserve battery power and avoid "mis-signaling" events, the unit may be configured to prevent sending IR signals upon detection of a simultaneous double key press. After the release of all the pressed keys, IR will be sent upon a single key press per standard operation.

In the event that the device code for a particular target is unknown, the user may be able to cycle the remote through the available code/functions for that device mode and sample functions for each code in order to find the code which properly operates the desired target device, i.e. step and set procedure. The keys which may be made available to be sampled, provided they are applicable to a given mode, are Power, Up, Channel Up, Volume Up, Play and Stop. To cycle through each available device code follow the below sequence:

[Mode]<<Magic>>4-4-4 Function 1[-Function 2-Function N] Mode-Magic.

The available functions within a code may be sampled as many times as desired until advancing to the next code by pressing the mode key near the end of the sequence. Pressing Magic listed at the end of the sequence shall then program the remote with the device code which was last sampled.

For the selected mode, the search may be programmed to begin with the most popular device code when no code is currently programmed, or shall begin with the currently programmed code. The LED may light each time a function is sent. If no key is pressed, the unit shall time-out of the program mode after 10 seconds and return to idle mode wherein it will revert to the previously programmed ID. The remote shall blink three times once it has cycled through all of the device codes for that mode and then recycled. The unit may blink two times after successful completion of the programming sequence. The unit may time out after 10 seconds during programming.

As has been suggested, one or more visible LEDs may be used for user feedback.

The keylock—unlock toggle feature enables the user to combine picked (assigned) functions from multiple ID's. This can be accomplished by programming an ID to a given device mode. A picked function can then be locked to the key to which it has been assigned picked. The user may then change the ID on that same device key, but the locked functions from the previously programmed ID will remain. To lock a function to the key follow the following sequence:

<<Magic>>4-3-4 valid function key to be locked (LED blinks twice).

To unlock a valid key follow the below sequence:

<<Magic>>4-3-4 valid key that is currently locked (LED blinks four time).

When the key is unlocked, its functionality will revert to the valid function key as picked for the current programmed ID in that device mode. If the key has been locked, but then later it has been "key learned" (e.g. a different data assigned), the previous "locked" data will then be lost.

The unit may be provided with an Input Select Toggle feature. The Input Select Toggle feature allows the user to change the output of the INPUT key. The default state is "unlocked." In this state, the IR output will be for a single picked function that changes the input of an AMP/Tuner or amplifier. If a particular ID does not have a single input or source function available, the default state for the ID state will be locked. When in the "locked" state the input key (also referred to herein as the function key) will rotate through a table that contains individual input functions for the target device. The table shall consist of as many input functions that are available for each ID. After rotating through the available input functions for the programed ID, the unit will restart at the beginning of the table. Input select toggle may be performed by the following sequence:

<<Magic>>4-3-2.

The unit may blink twice upon being locked and four times upon being unlocked.

A volume lock feature is available which shall be in the unlock state at Power Up. The effect of the volume lock shall apply to all modes. For all modes, the volume controls (Volume+, Volume−, Mute) shall be able to be programmed or "locked" to the selected device. This means regardless of the mode selected, the volume of the device to which the keys are locked will be effected by operation of the volume keys without regard to the system mode activated. This feature may be programmed such that it is not available to any mode keys that have been altered by mode reassignment. The Volume Lock sequence may be initiated as follows: <<Magic>>4-3-1 desired mode.

The user may reset the volume controls to be that of the original Power Up state as follows:

<<Magic>>4-3-1 volume up.

The unit may be configured to blink twice upon being locked and four times upon being unlocked. If Volume Lock is locked to a mode that is programmed with a ID that does not have a volume picked no IR is picked.

Figure 15A:
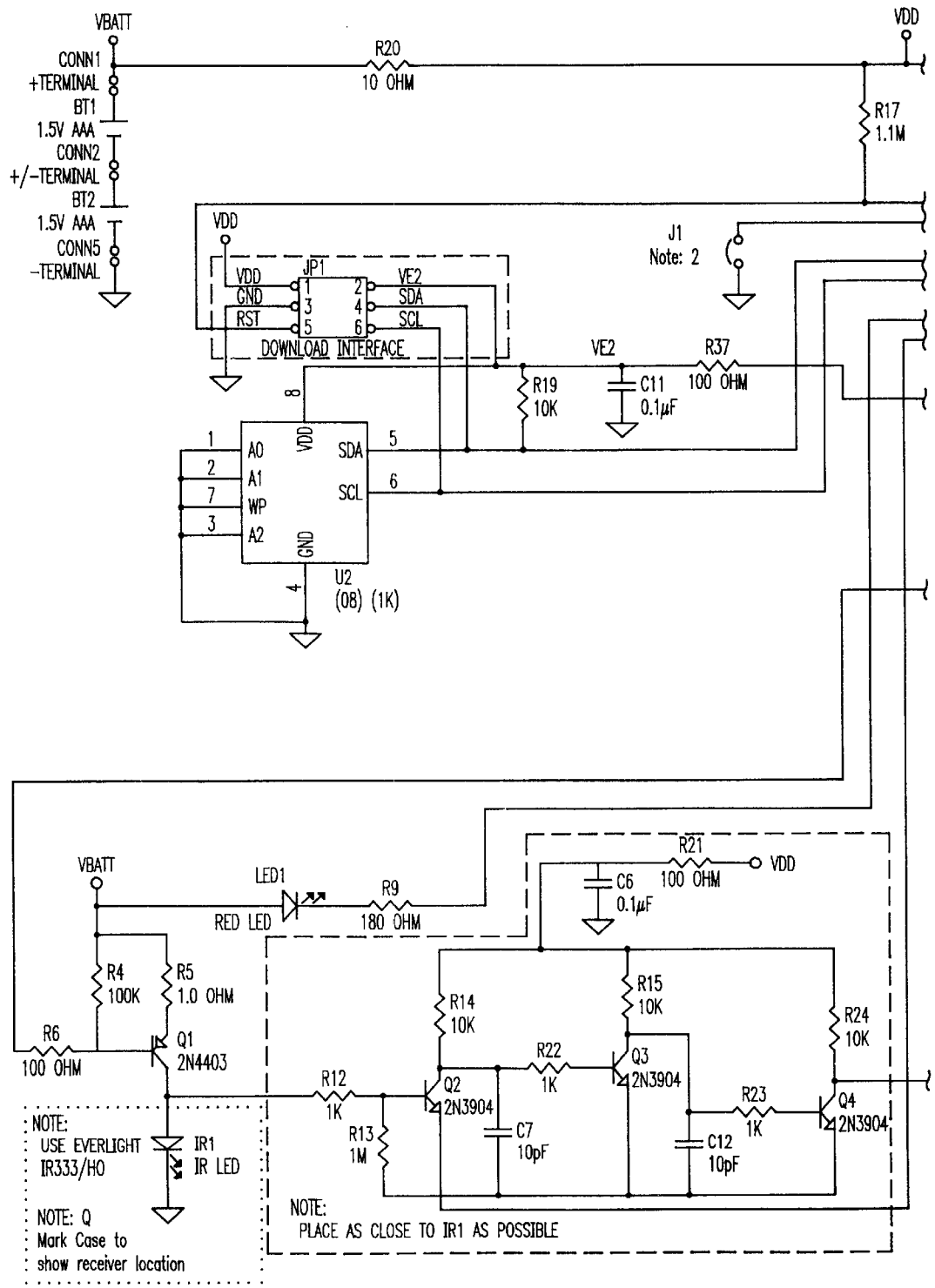
Figure 15B:
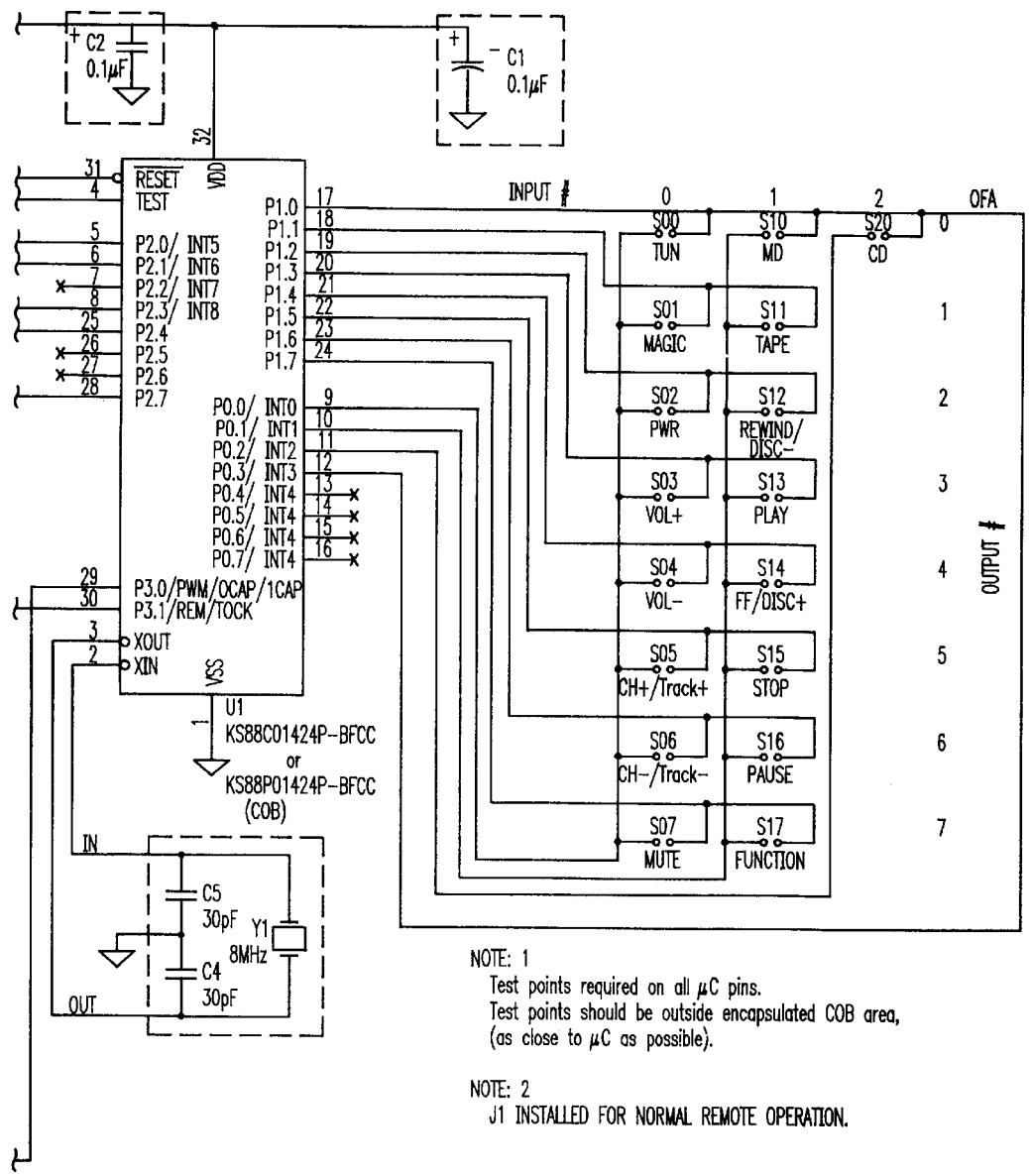

A preferred schematic is shown in FIGS. 15A and 15B and will be described in more detail below.

U1 is a Samsung KS88C01424P microcontroller, comprising a CPU, ROM, working register RAM and I/O ports all incorporated in a single integrated circuit.

Ceramic resonator Y1 provides a clock source for operation of the processor, and power is supplied by batteries BT1 and BT2.

The keypad matrix, contacts S00 through S20, are connected to the input/output pins of the microcontroller and provide the means of user input.

IR LED IR1 and associated driver transistor Q1 perform the infrared transmitting function under control of microcontroller output pin P3.1.

Red LED LED1 provides visible feedback to the user, under control of microcontroller output pin P2.3.

Transistors Q2, Q3 and Q4 comprise an amplifier circuit for use during the learning function. This circuit is similar in purpose to that described in co-pending U.S. application Ser. No. 09/080,125, filed on May 15, 1998, entitled "IR Receiver Using IR Transmitting Diode," and which is incorporated by reference. During the learning process, this amplifier is enabled via microcontroller pin P2.4, and its output is read by microcontroller input pin P3.0. A more complete description of this process can be found in the above referenced application.

Integrated circuit U2 is a 1 K byte EEPROM (Electrically Erasible Programmable Read Only Memory) for example an Atmel AT24C08-10PC. This is used by the microcontroller to store learned key functions as well as to retain set up parameters during battery changes. It is also possible to use a portion of this memory to add a new device code to the remote after manufacturing. For this purpose, connector JP1 is provided to allow direct access to the EEPROM by a factory programming system, as described in more detail in U.S. Pat. No. 5,953,144, which issued on Sep. 14, 1999 and is incorporated by reference.

The input pin labeled "TEST" is used by the microcontroller manufacturer for their testing of the IC chip. Once testing is complete, jumper J1 permanently connects this input to ground for normal operation.

Thus, although there have been described particular embodiments of the present invention of a new and useful Media System and Remote Control For Same, it is not intended that such references be construed as limitations upon the scope of this invention except as set forth in the following claims.

What is claimed is:

1. A remote control for a media system including a receiving device operably connected to receive one of at least two input sources, at least one input device operably connected to provide at least one of the at least two input sources, the remote control comprising:
   a hand held case including:
      a receiver mode key and an input device mode key;
      a plurality of device control keys; and
      a function key;
      first means for placing the remote control in a receiver mode, wherein operation of the plurality of device control keys will effect operation of the receiving device; and
      select means for selecting the one input source the receiving device will receive, wherein the one input source is selected upon operation of the function key.

2. The remote control of claim 1 wherein the select means comprises an input select table including the at least two input sources, wherein the input select table is stored in memory.

3. The remote control claim 1, wherein the select means includes means for incrementing an input select index in response to operation of the function key.

4. The remote control of claim 1, further comprising function lock means for toggling the remote control between a function-locked status and a function-unlocked status.

5. The remote control of claim 4, wherein the select means comprises means for selecting from an input select table in response to operation of the function key if no data is assigned to the function key, wherein the select means will attempt to send data assigned to the function key before selecting from the input select table.

6. A remote control adapted to effect operation of a receiver device, and first, second, and third input devices, the receiver device being adapted to receive a plurality of signals from a plurality of input sources, the signals including a plurality of input device signals from the input devices, the remote control comprising:
   a case including a receiver key, and first, second, and third device keys, each key operably connected to activate a corresponding receiver mode, and corresponding first, second, and third device modes;
   the case further including a plurality of device control keys operably connected to effectuate responses in the receiver, and the first, second, and third input devices when a respective corresponding mode is active; and
   the case still further including a function key operably connected to select one of the input sources, wherein the input source is selected from an input select table.

7. The remote control of claim 6, comprising input select programming stored in memory and responsive to operation of the function key.

8. The remote control of claim 7, wherein the select programming comprises input-select-table index management programming, and wherein the index management programming is responsive to operation of the function key.

9. The remote control of claim 6, wherein the function key is adapted to toggle between a "locked" status and an "un-locked" status, and wherein when the function key is in the un-locked status, operation of the function key will effectuate input source selection only if no function data is assigned to the function key, and when the function key is in the locked status, operation of the function key will effectuate input source selection without regard to whether function data is assigned to the function key.

10. The remote control of claim 6, comprising a plurality of input select tables stored memory, including the input select table, wherein at least one input select table corresponds to the tuner device, at least one input select table corresponds to the first device, at least one input select table corresponds to the second device, and at least one input select table corresponds to the third device.

11. The remote control of claim 6, comprising a plurality of input select tables stored in memory, including the input select table, wherein one input select table corresponds to the receiver mode, one input select table corresponds to the first device mode, one input select table corresponds to the second device mode, and one input select table corresponds to the third device mode.

12. The remote control of claim 6, wherein the input select table includes the first input device, and wherein the first device key is operably connected to select the first device key as the one of the input sources the receiver will receive, whereby activation of the first device mode configures the receiver to receive one of the plurality of input signals from the first input device.

13. A media system comprising:
   a receiver device adapted to receive a plurality of input signals;
   first and second input devices connected to supply respective input signals to the receiver; and
   a remote control programmed to effectuate responses in the receiver device, and the first and second input devices, the remote control including a receiver mode key, and first input, and second input mode keys, mode programming responsive to the mode keys and programmed to activate corresponding modes, select programming having an input-select table including the first and second input devices, the select programming programmed to effectuate configuration responses in the receiver device, including configuring the receiver device to receive a selected input signal from one of the first or second input devices, the remote control further including a function key, wherein the select programming is responsive to the function key, and wherein operation of the function key effectuates the configuration responses in the receiver.

14. The media system of claim 13, wherein the select programming is responsive to the mode keys, and wherein operation of the first input mode key activates the corresponding mode and configures the receiver to receive the selected input signal from the first input device.

15. The system of claim 13, wherein the remote control is non-digitally keyed.

16. A remote control comprising:

a receiver mode key, and first input, and second input mode keys;

mode programming responsive to the mode keys and programmed to activate corresponding modes;

signal generating circuitry;

a function key operably connected to the signal generating circuitry; and select programming having an input-select table including a plurality of input sources, the input sources including first and second input devices, wherein the signal generating circuitry generates a receiver configuration signal to configure a receiver to receive input from one of the plurality of input sources, and wherein the select programming is responsive to the function key.

17. The remote control of claim 16, wherein the select programming steps through the input-select table in response to the function key.

18. The remote control of claim 16, wherein select programming comprises a plurality of input-select tables, including the input-select table, wherein at least one input-select table corresponds to each mode.

19. The remote control of claim 18, wherein each input-select table includes a pointer respectively corresponding to each mode.

20. The remote control of claim 16, wherein the select programming is responsive to the mode keys, and wherein a first input receiver configuration signal is generated in response to operation of the first input mode key.

21. The remote control of claim 16, wherein the select programming includes select-input-table index management programming.

22. The remote control of claim 21, wherein the select-input-table index management programming increments an index in response to operation of the function key.

23. The remote control of claim 16, comprising:

a key group operably connected to the signal generating circuitry, wherein keys of the key group correspond to respective functions supported by a first input device and not supported by a second input device; and wherein the mode programming will activate the first input mode when in the second input mode in response operation of one of the keys in the key group.

* * * * *